July 2, 1963

W. A. REINHART 3,095,697

NOISE SUPPRESSION NOZZLES WITH THRUST
REVERSAL PROVISION FOR JET ENGINES

Filed Feb. 7, 1956

INVENTOR.
WILLIAM A. REINHART
BY
Reynolds, Beach & Christensen

ATTORNEYS

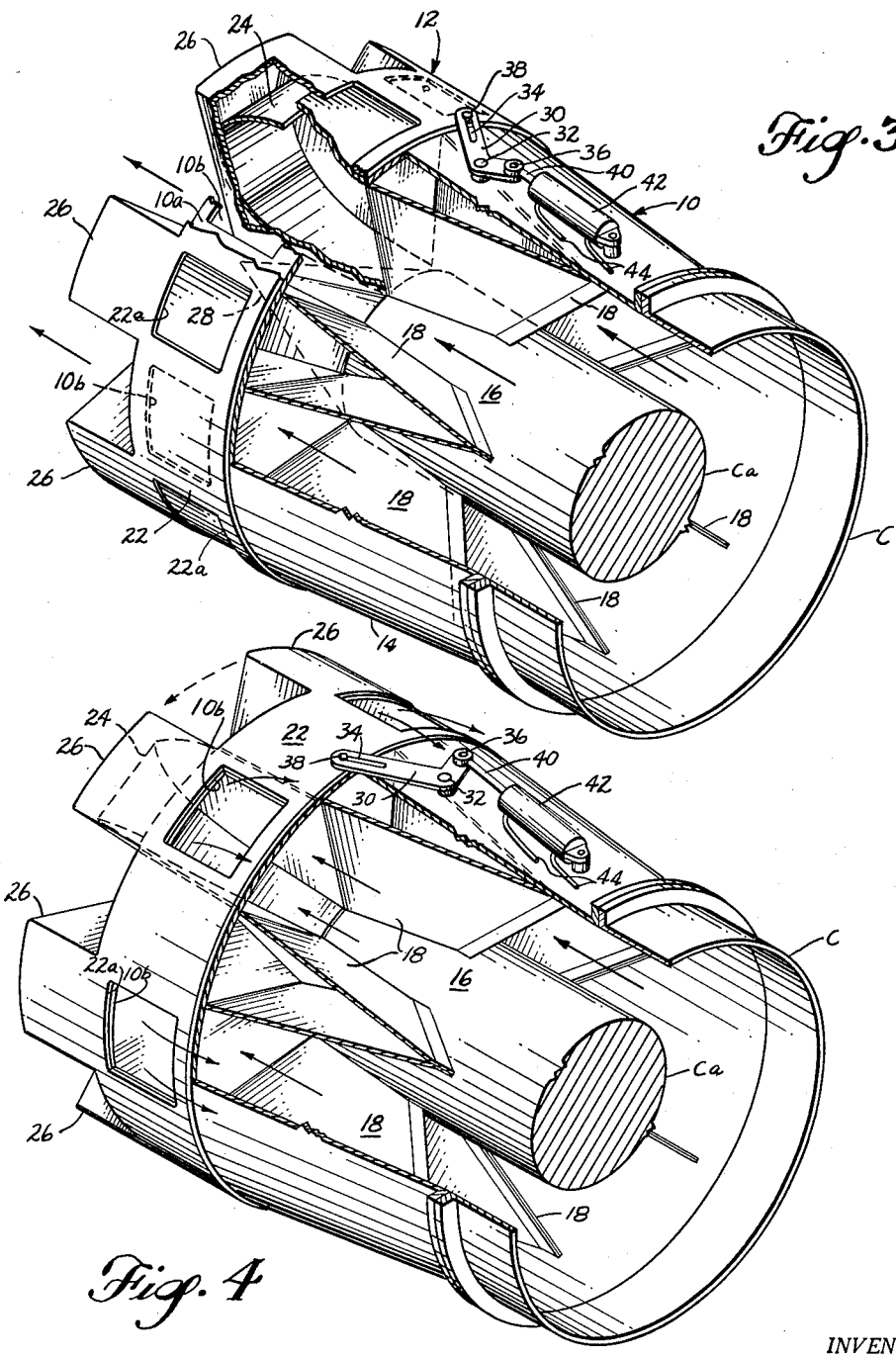

United States Patent Office 3,095,697
Patented July 2, 1963

3,095,697
NOISE SUPPRESSION NOZZLES WITH THRUST REVERSAL PROVISION FOR JET ENGINES
William A. Reinhart, Bellevue, Wash., assignor to Boeing Airplane Company, Seattle, Wash., a corporation of Delaware
Filed Feb. 7, 1956, Ser. No. 563,953
4 Claims. (Cl. 60—35.54)

This invention relates to an improved nozzle for jet engines and the like, including means for reducing or suppressing the wake noise which attends operation of such engines, combined with means operable at will for reversing the direction of thrust produced by the engine discharge. The invention is herein illustratively described by reference to the presently preferred form thereof; however, it will be recognized that certain modifications and changes therein may be made without departing from the essential or characterizing features involved. Certain aspects of the present disclosure comprise subject matter contained in the copending patent application of George S. Schairer, Serial No. 562,050, filed January 30, 1956, now abandoned, and of William A. Reinhart, Serial No. 563,952, filed February 7, 1956, now abandoned.

An object of the present invention is a new and improved nozzle means operable for effectively reversing direction of thrust of jet engines or other gas stream thrust reaction engines, thereby to enable rapidly decelerating the airplane or other vehicle when desired.

A related object is such a means which are relatively compact, lightweight, simple, rugged, effective and reliable and which may be easily and quickly actuated during engine operation to effect transition between normal and reverse-thrust settings.

Another object of the invention is an improved noise suppression jet engine nozzle means having provision for reversing engine thrust with a relatively short movement of the thrust reversing elements.

Still another object is thrust reversal nozzle means for jet engines and the like which reduces the noise of operation of such engines both in the normal setting and in the reverse-thrust setting thereof below the noise level generally attending operation of conventional jet engines of comparable power.

As herein disclosed the improved nozzle means includes a fixed nozzle portion forming a plenum chamber, preferably annular in form, receiving and passing the discharge of gases from the engine, and orifice means dividing the discharge stream into a plurality of branch stream portions spaced apart at interval locations about the engine axis. The nozzle means further comprises a rotative nozzle portion mounted on the fixed nozzle portion and including a plurality of stream-deflecting thrust reversal elements normally positioned in the spaces between the successively adjacent branch streams and shiftable rotatively as a group about the engine axis through a relatively small displacement and with relatively small actuating force into stream-intercepting positions, thereby to deflect the discharge streams forwardly in order to reverse the engine thrust. The division of gas flow into a plurality of branch streams and the separation of such streams laterally from each other to prevent recombining thereof until much of the violent eddying of the gases has taken place, both in the normal setting and in the reverse-thrust setting of the nozzle means, makes for comparatively quiet engine operation, for reasons explained in the above-cited copending patent applications.

These and other features, objects and advantages of the invention will become more fully evident from the following description thereof by reference to the accompanying drawings.

FIGURE 3 is a front perspective view with certain parts broken away to show interior construction of the nozzle means mounted on the after portion of a jet engine, the view showing the nozzle in the normal-thrust setting.

FIGURE 4 is a similar perspective view with parts broken away and showing the movable nozzle portion in thrust-reversing position.

Figure 1:
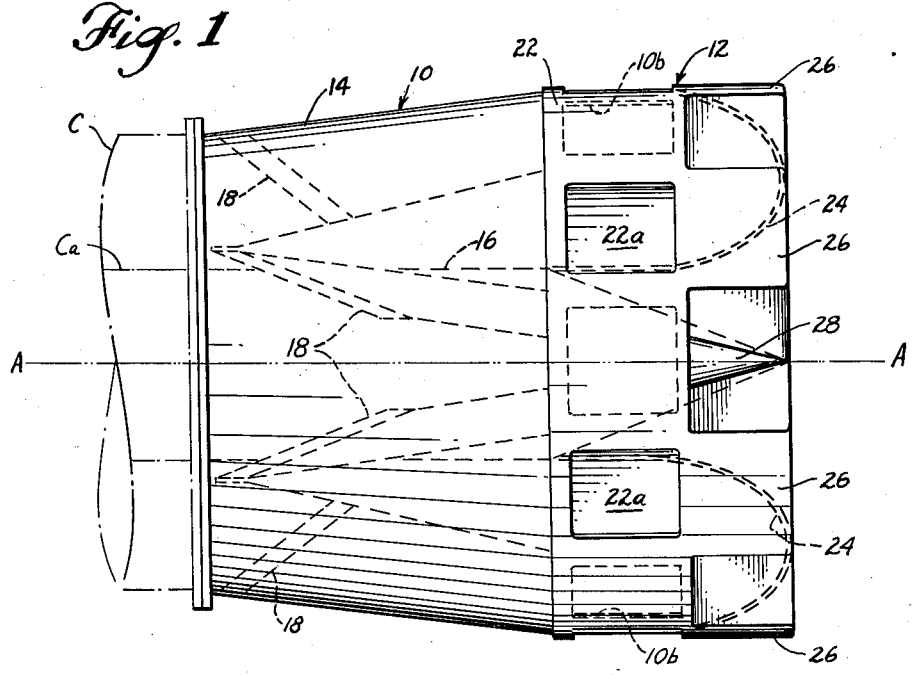
FIGURE 1 is a side view of the after portion of a jet engine having the improved nozzle means.

In the drawings, the movable nozzle portion 12 is rotatively mounted on the fixed nozzle portion 10 and the latter in turn is mounted upon the after portion of the engine discharge chamber or duct formed by the outer cylindrical or tubular member C and the inner cylindrical or tubular member Ca. Rotative adjustment of the movable nozzle pipe 12 about engine axis A—A effects a transition between the normal-thrust setting and the reverse-thrust setting of the engine as will be hereinafter more fully described.

The fixed nozzle portion 10 comprises the rearwardly divergent outer cylindrical or tubular member 12 constituting a rearward continuation of the outer engine part C, and the inner cylindrical or tubular member 16 constituting a rearward continuation of the inner engine part Ca. The outer and inner nozzle parts 14 and 16 form an annular plenum chamber therebetween concentric with the nozzle axis A—A. Exhaust gases discharging through the space between the engine duct walls C and Ca enter this annular plenum chamber for discharge through the after portion of the nozzle. The flow through the plenum chamber formed between nozzle parts 14 and 16 is divided into a plurality of separate streams by the stream-splitting dividers 18 which extend radially between the parts 14 and 16 and which are forwardly tapered so as to present a minimum resistance to flow of gases through the nozzle. The leading edges of the dividers 18 are preferably inclined forwardly at an acute angle to the longitudinal axis A—A. The dividers are relatively wide at their trailing edges in order to separate the divisional stream portions by material distances at the nozzle and thereby prevent their immediate recombining upon leaving the nozzle to generate intense low-frequency sound. In the example six such wedge-shaped dividers are employed, dividing the gas flow into six radially extending rearward discharge streams emerging from the orifice spaces 20 formed between the successively adjacent stream dividers.

The outer nozzle part 10 has a cylindrical flange portion 10a formed with a plurality of rectangular apertures 10b therein spaced apart circumferentially of the flange at the spacing intervals of the orifice spaces 20 formed by and between the sides of successively adjacent stream dividers. These apertures 10b serve a purpose which will become more fully evident as the description proceeds.

The movable nozzle portion 12 rotatively mounted on the fixed nozzle portion 10 comprises the annular skirt 22 which overlaps the flange part 10a of the fixed nozzle part 14. The skirt 22 likewise has a plurality of apertures 22a therein which are circumferentially spaced apart by the same distances as the apertures 10b and which preferably have the same shape and size as the apertures 10b. Rotative adjustment of the skirt 22 about the axis A—A therefore permits positioning of the set of apertures 22a in registry and out of registry with the set of apertures 10b.

Figure 2:
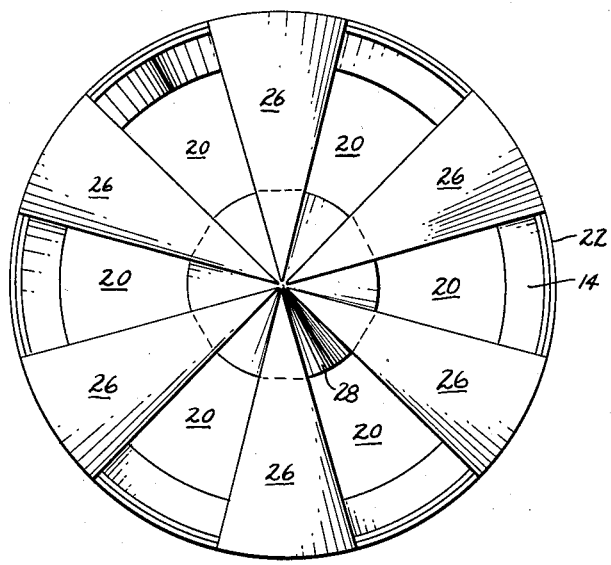
FIGURE 2 is a rear view of the nozzle means.

The movable nozzle portion 12 further comprises a plurality of stream-deflecting, thrust-reverser elements in the form of curved plates 24 mounted in and supported by housings 26. Viewed along the axis of the engine the housings 26 and the thrust reverser elements 24 therein appear to be shaped as a circular sector (FIGURE 2) alternately occupying positions overlying the nozzle openings 20 or the spaces therebetween in accordance with the rotated position of the movable nozzle part 12. The thrust-reverser elements 24 are curved in a diametral plane through the same, extending rearwardly from their forward edges disposed along the periphery of the inner nozzle part 16 and curving gradually outwardly, thence forwardly and outwardly in a smooth contour by which rearwardly flowing gases passing through orifice openings 20 may be intercepted and progressively turned in the reverse direction through the aligned apertures 22a and 10b in the thrust-reversal setting of the nozzle portion 12. The radially outer faces of the housing 26 have a cylindrical curvature constituting a continuation of the outer surface of the skirt portion 22. Moreover, the side faces of the housings 26 are contained in diametral planes of the nozzle and form rearward continuations of the walls of the stream dividers 18 for discharge of gases rearwardly through the spaces between adjacent housings in the normal-thrust setting of the movable nozzle portion 12.

A rearwardly-tapered tail cone 28 projects rearwardly from the after end of the inner nozzle part 16 and has a base diameter approximately equal to the diameter of the part 16. The radially inner ends of the housings 26 which contain and support the thrust reverser buckets 24 are welded or otherwise secured to the surface of the tail cone 28. The cone preferably rotates about the axis A—A and with it the assembly comprising the removable nozzle portion 12. The details of the mounting means permitting such rotation of the cone are not shown in order to simplify the drawings, but it will be understood that any suitable rotational bearing support for the cone and rotative nozzle portion 12 relative to the inner nozzle part or island 16 may be employed.

The tail cone 28 not only serves as a support for the reverser element housings 26 but, in association with the stream dividers 18, provides an efficient engine having relatively low noise level. Provision of the tail cone or its equivalent separates the inner edges of oppositely disposed orifice openings 20 sufficiently to aid materially in the establishment of separation between the divisional stream portions conducive to low-noise operation in the normal-thrust setting of the nozzle means.

In order to rotatively shift the movable nozzle part 12 about the axis A—A any suitable means capable of actuation by the airplane pilot or by automatic control may be provided. In the example a bell crank 30 pivotally mounted at 32 on the outer surface of the flared outer nozzle part 10 has a slot 34 in one arm and a pin 36 in the opposite arm. The slot 34 engages a pin 38 on the skirt of the movable nozzle portion 12 and the pin 36 serves as a connection to the piston rod 40 of the hydraulic jack 42. Actuation of the jack by application of hydraulic pressure differential to the conduits 44 in one sense swings the bell crank and rotates the movable nozzle portion 12 in one direction about axis A—A, whereas opposite pressure differential applied to the conduits 44 effects reverse shifting of the movable nozzle portion. One limit of travel of the movable nozzle portion 12 is that in which the apertures 22a are aligned with the apertures 10b, representing the reverse-thrust setting of the nozzle means, and the other limit position is that in which the spaces between the adjacent housings 26 are aligned with the orifice spaces 20 between adjacent stream dividers 18, representing the normal-thrust setting.

In the reverse-thrust setting of the nozzle means the flow of gases is directed by the reverser buckets 24 out through the aligned apertures 10b and 22a in a forward and outward direction as shown by the arrows in FIGURE 4. It will be noted that the emerging jet streams are separated laterally from each other as they are in the case of the normal thrust setting of the nozzle. The engine operates relatively quietly, therefore, both in the reverse-thrust and in the normal-thrust settings of the nozzle means due to the division of the stream into a plurality of branch streams and the lateral separation of the branch streams from one another, preventing recombining thereof close to the nozzle, hence precluding the generation of intense low-frequency noise attending operation of conventional jet engines. Also it will be noted that the division of the discharge stream of the engine into a plurality of branch streams grouped in successively spaced relationship and the provision of thrust reverser elements which are mounted normally in the spaces between streams for movement into stream-intercepting relationship, enables the accomplishment of thrust reversal setting by a relatively short movement of the reversing means, by relatively small actuating force and in a comparatively simple and direct manner.

These and other aspects of the invention will be evident to those skilled in the art from the foregoing disclosure of the preferred embodiment thereof.

I claim as my invention:

1. Jet engine nozzle means comprising rearwardly directed nozzle discharge duct means including an outer wall having a plurality of ports therein located forwardly of the after end thereof and spaced apart in successive serial relationship transversely of the direction of discharge through said duct means, a like plurality of stream dividers mounted in said duct means at respective transversely spaced locations between said ports, thereby to confine the rearward discharge flow transversely to the regions adjacent to said ports, the transverse spacing between such stream dividers at the after end thereof being substantially equal to their width at such ends, cover means longitudinally overlapping said outer wall and ports and having a like plurality of openings therein registrable with said ports, said cover means being movable transversely of the duct means to position its openings in the spaces between said ports, thereby to open and close said ports, and discharge directing means connected with said cover means to be movable therewith, said directing means comprising a like plurality of generally transversely disposed deflectors including deflecting surfaces extending inwardly from the outer wall and rearwardly from the vicinity of the after edges of the respective openings, said deflectors having a width and spacing substantially to close the respective spaces between said stream dividers against rearward discharge and to direct such discharge outwardly and forwardly through said openings with the latter in registry with said ports, thereby to reverse nozzle thrust, said deflectors having after ends longitudinally positioned substantially at the after end of said outer wall and of a width, measured transverse to the direction of discharge and parallel to the series extent of the ports and openings, substantially equal to said stream divider after end width, thereby to form stream divider extensions with bluff after ends to suppress jet noise while producing forward thrust.

2. The jet engine nozzle means defined in claim 1, wherein the outer wall is of generally cylindrical form having a longitudinal central axis and the cover means comprises rotary sleeve means concentric therewith, the ports, openings, stream dividers and discharge directing means being disposed in circumferentially spaced series relationship grouped about said axis.

3. The jet engine nozzle means defined in claim 2, wherein the duct means further comprises an island having a tail cone extension on the after end thereof substantially centrally mounted within the cylindrical outer wall to define an annular flow space therebetween.

4. Jet engine nozzle means comprising an annular discharge duct having a generally cylindrical wall, a plurality of radially disposed fingers spaced apart successively by approximately the width thereof measured circumferentially of the duct, said fingers having forwardly tapered upstream end portions and bluff downstream ends located at least substantially as far to the rear of the nozzle as the after end of said wall, whereby discharge gases emerge rearwardly from between such fingers with material separation permitting inflow of surrounding ambient air to promote mixing with such gases and thereby to suppress noise, said fingers individually comprising upstream and after segments, rotary sleeve means carrying said after segments and extending forwardly in overlapping relationship with the after end of said discharge duct, said discharge duct having ports therein located between said upstream finger segments, and said sleeve means having openings therein located between said after segments and registrable with said ports with the finger after segments obstructively aligned with the spaces between said finger upstream segments, said after segments having outwardly and forwardly inclined flow directing surfaces therein situated immediately aft of said sleeve openings to direct the discharge gases forwardly through said ports with the openings and ports in registry.

References Cited in the file of this patent

UNITED STATES PATENTS

| | | |
|---|---|---|
| 2,847,822 | Hausmann | Aug. 19, 1958 |

FOREIGN PATENTS

| | | |
|---|---|---|
| 165,369 | Australia | Sept. 24, 1953 |
| 202,293 | Australia | May 12, 1955 |
| 63,239 | France | Mar. 30, 1955 |

OTHER REFERENCES

"Reduction of Jet Noise," Flight Magazine, vol. 68, No. 2424, pp. 57–60.